United States Patent
Murthy et al.

(10) Patent No.: US 10,921,541 B2
(45) Date of Patent: Feb. 16, 2021

(54) CYLINDRICAL ENCLOSURE FOR OPTICAL WAVEGUIDE CABLE

(71) Applicant: Sterlite Technologies Limited, Aurangabad (IN)

(72) Inventors: Venkatesh Murthy, Aurangabad (IN); Kishore Sahoo, Aurangabad (IN); Sravan Kumar Peraka, Aurangabad (IN); Atul Mishra, Aurangabad (IN); Pavan Kumar Moturu, Aurangabad (IN); Kavya Chintada, Aurangabad (IN)

(73) Assignee: STERLITE TECHNOLOGIES LIMITED, Aurangabad (IN)

(*) Notice: Subject to any disclaimer, the term of this patent is extended or adjusted under 35 U.S.C. 154(b) by 0 days.

(21) Appl. No.: 16/574,213

(22) Filed: Sep. 18, 2019

(65) Prior Publication Data

US 2020/0012065 A1 Jan. 9, 2020

Related U.S. Application Data

(63) Continuation of application No. 16/224,793, filed on Dec. 19, 2018, now Pat. No. 10,481,359.

(30) Foreign Application Priority Data

Feb. 14, 2018 (IN) .............................. 201811005501

(51) Int. Cl.
*G02B 6/44* (2006.01)

(52) U.S. Cl.
CPC ......... *G02B 6/4494* (2013.01); *G02B 6/4402* (2013.01); *G02B 6/4403* (2013.01); *G02B 6/4432* (2013.01); *G02B 6/4433* (2013.01); *G02B 6/4434* (2013.01); *G02B 6/4484* (2013.01)

(58) Field of Classification Search
CPC ........................... G02B 6/4494; G02B 6/4432
See application file for complete search history.

(56) References Cited

U.S. PATENT DOCUMENTS

| | | | | |
|---|---|---|---|---|
| 7,567,739 B2 * | 7/2009 | Overton | ............... | G02B 6/4494 385/100 |
| 8,682,123 B2 * | 3/2014 | Parris | ................... | G02B 6/4494 385/100 |
| 9,581,777 B2 * | 2/2017 | Baucom | ............... | G02B 6/4403 |
| 2004/0091221 A1 * | 5/2004 | Debban, Jr. | .......... | G02B 6/4411 385/114 |
| 2004/0120666 A1 * | 6/2004 | Chalk | .................. | G02B 6/4404 385/114 |

(Continued)

*Primary Examiner* — Sung H Pak

(57) ABSTRACT

The present disclosure provides an optical waveguide cable. The optical waveguide cable includes one or more optical waveguide bands positioned substantially along a longitudinal axis of the optical waveguide cable. The optical waveguide cable includes one or more layers substantially concentric to the longitudinal axis of the optical waveguide cable. The one or more layers include a cylindrical enclosure. The one or more optical waveguide bands include a plurality of light transmission elements. The density of the cylindrical enclosure is at most 0.935 gram per cubic centimeter. The optical waveguide cable has a waveguide factor of about 44%. The one or more optical waveguide bands are coupled longitudinally with the cylindrical enclosure.

15 Claims, 3 Drawing Sheets

(56) References Cited

U.S. PATENT DOCUMENTS

| | | | | |
|---|---|---|---|---|
| 2006/0272768 A1* | 12/2006 | Kitamura | ................ | B32B 7/06 |
| | | | | 156/244.11 |
| 2008/0181564 A1* | 7/2008 | Overton | ............... | G02B 6/4494 |
| | | | | 385/109 |
| 2012/0014652 A1* | 1/2012 | Parris | .................. | G02B 6/4411 |
| | | | | 385/111 |
| 2013/0084047 A1* | 4/2013 | Baucom | .................. | G02B 6/44 |
| | | | | 385/114 |
| 2014/0045998 A1* | 2/2014 | Ceccarani | .............. | C08L 23/06 |
| | | | | 525/240 |
| 2016/0264765 A1* | 9/2016 | Barry | ...................... | C08L 23/06 |
| 2016/0313529 A1* | 10/2016 | Baucom | .............. | G02B 6/4494 |

\* cited by examiner

US 10,921,541 B2

CYLINDRICAL ENCLOSURE FOR OPTICAL WAVEGUIDE CABLE

TECHNICAL FIELD

The present disclosure relates to the field of an optical waveguide cable. More particularly, the present disclosure relates to the optical waveguide cable for outdoor and underground applications. The present application is a continuation application of co-pending U.S. application Ser. No. 16/224,793 filed on 19 Dec. 2018 which is in based on, and claims priority from Indian application No. 201811005501 filed on 14 Feb. 2018, the disclosure of which is hereby incorporated by reference herein.

BACKGROUND

Optical fiber cables have secured an important position in building network of modern communication systems across the world. One such type of optical fiber cables are optical fiber ribbon cables. These optical fiber ribbon cables are installed in ducts. These optical fiber ribbon cables include a plurality of optical fiber ribbons. Each optical fiber ribbon includes a number of optical fibers placed adjacent and bonded together with a matrix material. These optical fiber ribbons may be held inside a central loose tube which may be covered by additional layers such as water blocking layers, armouring layer, sheathing layer and the like. In addition, the optical fiber ribbons may or may not be coupled to the central loose tube. In addition, these optical fiber ribbon cables can be prepped and spliced rapidly through mass fusion splicing. This leads to easy installation, less installation time, low installation cost and the like. Traditionally, these optical fiber ribbon cables do not have any gel present inside the core which reduces preparation time.

SUMMARY

The present disclosure relates to an optical waveguide cable. The optical waveguide cable is defined by a longitudinal axis passing through a geometrical center of the optical waveguide cable. The optical waveguide cable includes one or more optical waveguide bands positioned substantially along the longitudinal axis of the optical waveguide cable. In addition, the optical waveguide cable includes one or more layers substantially concentric to the longitudinal axis of the optical waveguide cable. Further, the optical waveguide cable includes a cylindrical enclosure positioned substantially along the longitudinal axis of the optical waveguide cable. Each of the one or more optical waveguide bands includes a plurality of light transmission elements. The plurality of light transmission elements is made of silicon glass. The one or more layers surround the one or more optical waveguide bands. Each of the one or more layers is substantially along the longitudinal axis of the optical waveguide cable. The cylindrical enclosure has a density of at most 0.935 gram per cubic centimeter. In addition, the cylindrical enclosure has a melt mass-flow rate of about 0.70 gram per 10 minutes. Further, the cylindrical enclosure has a kink radius of about 4D.

The density is measured at a plurality of conditions. The plurality of conditions includes a temperature range of about 21 degree Celsius to 25 degree Celsius. In addition, the plurality of conditions includes a relative humidity of about 40% to 60%. Further, the plurality of conditions is required for at least 40 hours before a test to find out the density of the cylindrical enclosure. The density of the cylindrical enclosure is at most 40% of density of the plurality of light transmission elements. The optical waveguide cable has a waveguide factor of about 44%. The waveguide factor is a ratio of average cross-sectional area of the one or more optical waveguide bands to average cross-sectional area of the cylindrical enclosure. The one or more optical waveguide bands are coupled longitudinally with the cylindrical enclosure. The coupling of the one or more optical waveguide bands with the cylindrical enclosure is defined by at least one corner of the one or more optical waveguide bands and the one or more layers.

A primary object of the present disclosure is to provide an optical waveguide cable that facilitates improved coupling of optical waveguide band within a cylindrical enclosure.

Another object of the present disclosure is to provide an optical waveguide cable which would be suitable for outdoor applications.

Yet another object of the present disclosure is to provide an optical waveguide cable with reduced density of the cylindrical enclosure.

In an aspect, the present disclosure provides an optical waveguide cable. The optical waveguide cable is defined by a longitudinal axis passing through a geometrical center of the optical waveguide cable. The optical waveguide cable includes one or more optical waveguide bands positioned substantially along the longitudinal axis of the optical waveguide cable. In addition, the optical waveguide cable includes one or more layers substantially concentric to the longitudinal axis of the optical waveguide cable. Further, the optical waveguide cable includes a cylindrical enclosure positioned substantially along the longitudinal axis of the optical waveguide cable. Each of the one or more optical waveguide bands includes a plurality of light transmission elements. The plurality of light transmission elements are made of silicon glass. The one or more layers surround the one or more optical waveguide bands. Each of the one or more layers is substantially along the longitudinal axis of the optical waveguide cable. The cylindrical enclosure has a density of at most 0.935 gram per cubic centimeter. In addition, the cylindrical enclosure has a melt mass-flow rate of about 0.70 gram per 10 minutes. Further, the cylindrical enclosure has a kink radius of about 4D.

In an embodiment of the present disclosure, the density is measured at a plurality of conditions. The plurality of conditions includes a temperature range of about 21 degree Celsius to 25 degree Celsius and a relative humidity of about 40% to 60%. In addition, the plurality of conditions is required for at least 40 hours before a test to find out the density of the cylindrical enclosure. Further, the density of the cylindrical enclosure is at most 40% of density of the plurality of light transmission elements.

In an embodiment of the present disclosure, the one or more layers comprise a first water blocking element inside the cylindrical enclosure. The first water blocking element surrounds the one or more optical waveguide bands. In addition, the first water blocking element prevents ingression of water in and around the one or more optical waveguide bands.

In an embodiment of the present disclosure, the cylindrical enclosure is made of a medium density polyethylene material. The medium density polyethylene material provides an environmental stress cracking resistance of at least 500 hour to the cylindrical enclosure. In addition, the medium density polyethylene material provides a tensile strength of about 4000 mega Pascal to the cylindrical enclosure. Further, the cylindrical enclosure has a brittleness temperature of at most 100 degree Celsius. The cylindrical enclosure has a tensile elongation at break of about 1000 percent In an embodiment of the present disclosure, the optical waveguide cable includes a waveguide factor of about 44%. In addition, the waveguide factor is a ratio of average cross-sectional area of the one or more optical waveguide bands to average cross-sectional area of the cylindrical enclosure. Further, the one or more optical waveguide bands are coupled longitudinally with the cylindrical enclosure. The coupling of the one or more optical waveguide bands with the cylindrical enclosure is defined by at least one corner of the one or more optical waveguide bands and the one or more layers.

In an embodiment of the present disclosure, the one or more layers include a single cylindrical enclosure.

In an embodiment of the present disclosure, the protective cover is made of a medium density polyethylene material. The medium density polyethylene material of the protective cover has a density of about 0.935 gram per cubic centimeter. In addition, the protective cover has a melt mass flow rate of about 0.70 gram per 10 minute. The medium density polyethylene material provides an environmental stress cracking resistance of at least 500 hour to the protective cover. In addition, the medium density polyethylene material provides a tensile strength of about 4000 mega Pascal to the protective cover. Further, the protective cover has a brittleness temperature of at most 100 degree Celsius. The protective cover has a tensile elongation at break of about 1000 percent.

In an embodiment of the present disclosure, the optical waveguide cable includes a plurality of robust components. The plurality of robust components is embedded inside the protective cover of the optical waveguide cable.

In an embodiment of the present disclosure, the optical waveguide cable includes one or more tearing strings. The one or more tearing strings positioned below the protective cover of the optical waveguide cable.

In an embodiment of the present disclosure, the one or more layers being selected from a group. The group includes a fire resistance tape layer, a water swellable tape layer, an armor layer, a glass roving yarn layer, a binder yarn layer and an aramid yarn layer.

In an embodiment of the present disclosure, the cylindrical enclosure is at a diagonal distance of about 0.9 millimeter from the one or more optical waveguide bands.

In an embodiment of the present disclosure, the plurality of light transmission elements exhibit a change in attenuation of at most 0.05 dB/km at a wavelength of about 1550 nanometer at a temperature range of −40 degree Celsius to +70 degree Celsius in a time period of 2 cycles with 12 hours/cycle (as per GR 20).

In an embodiment of the present disclosure, the plurality of light transmission elements has a maximum attenuation of 0.36 dB/km at a wavelength of about 1310 nanometers at a room temperature.

In an embodiment of the present disclosure, the plurality of light transmission elements has a maximum attenuation of 0.24 dB/km at a wavelength of about 1550 nanometers at room temperature.

In an embodiment of the present disclosure, the plurality of light transmission elements has a maximum attenuation of 0.26 dB/km at a wavelength of about 1625 nanometers at room temperature.

In an embodiment of the present disclosure, the one or more optical waveguide bands have a fill factor of about 0.445.

In an embodiment of the present disclosure, the plurality of light transmission elements has a fill factor of about 0.109.

In an embodiment of the present disclosure, the cylindrical enclosure is made of at least one layer. Each layer of the at least one layer is made of a single material.

In an embodiment of the present disclosure, the cylindrical enclosure is made of at least one layer. Each layer of the at least one layer is made of combination of a plurality of materials.

In an embodiment of the present disclosure, the cylindrical enclosure is constructed from an extruded polymeric material. The polymeric material is selected from the group. The group includes High Density Polyethylene, polyethylene terephthalate, polypropylene, polyethylene, polyvinyl chloride, Low density polyethylene and Low smoke zero halogen.

In an embodiment of the present disclosure, the cylindrical enclosure is constructed from a pultruded fiber reinforced plastic material.

In an embodiment of the present disclosure, the cylindrical enclosure is dry.

In an embodiment of the present disclosure, the cylindrical enclosure includes a thixotropic gel. In addition, the thixotropic gel prevents ingression of water inside the cylindrical enclosure.

BRIEF DESCRIPTION OF THE FIGURES

Figure 1:
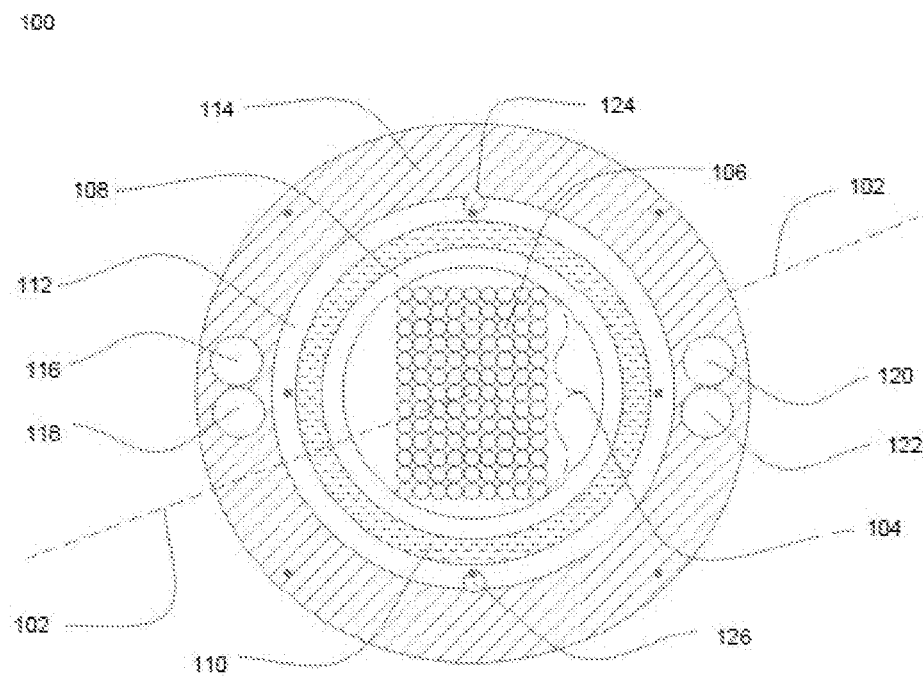
Figure 2:
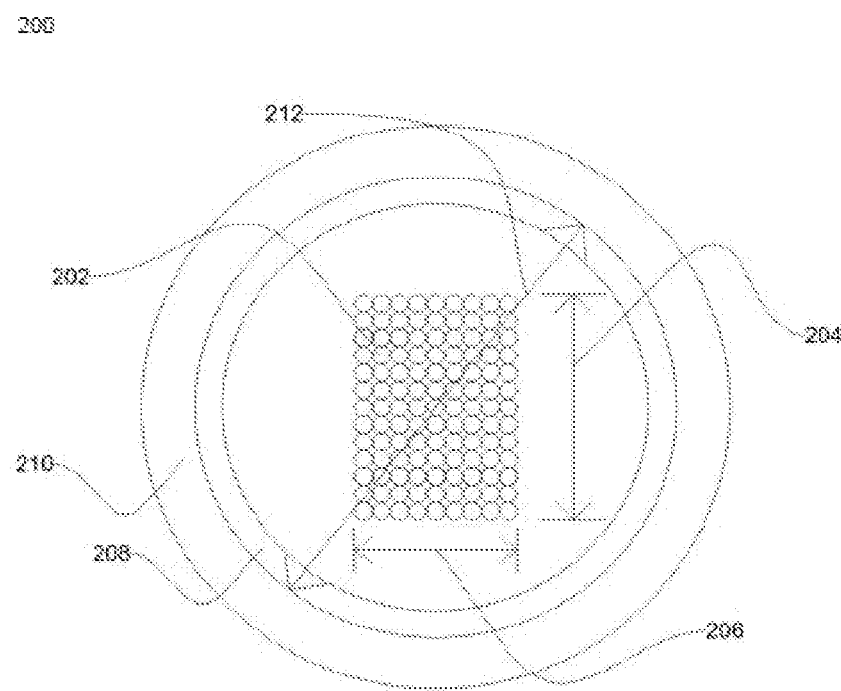
Figure 3:
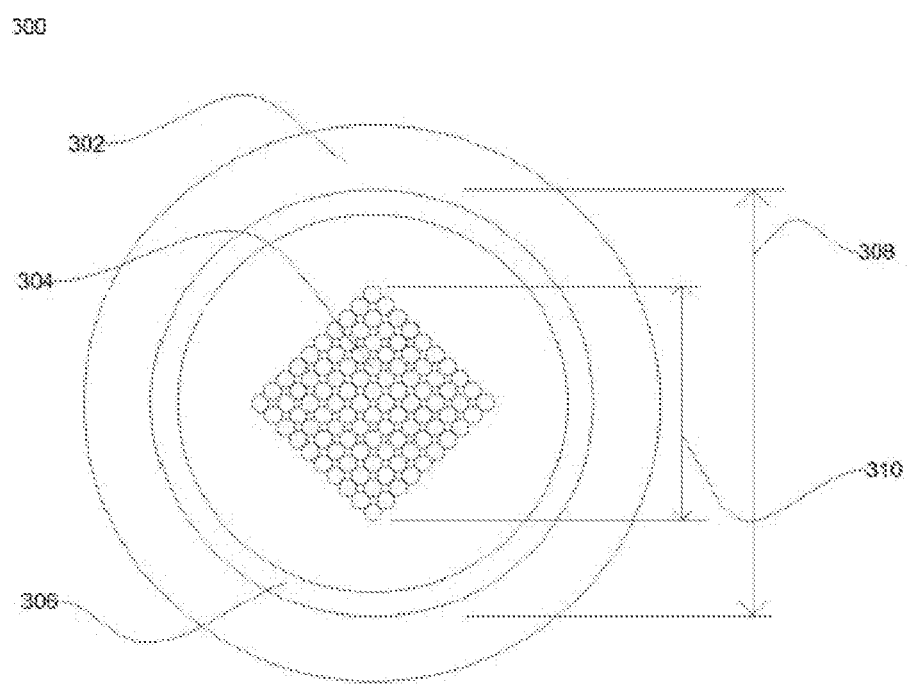

Having thus described the disclosure in general terms, reference will now be made to the accompanying figures, wherein:

FIG. 1 illustrates a cross sectional view of an optical waveguide cable for outdoor applications, in accordance with an embodiment of the present disclosure;

FIG. 2 illustrates a cross sectional view of an optical waveguide cable with a waveguide factor, in accordance with another embodiment of the present disclosure;

FIG. 3 illustrates a cross sectional view of an optical waveguide cable having a diagonal distance of one or more optical waveguide bands, in accordance with yet another embodiment of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

REFERENCE NUMERALS IN THE FIGURES

For a more complete understanding of the present invention parts, reference is now made to the following descriptions:

100—The optical waveguide cable.
102—Longitudinal axis.
104—Optical waveguide bands.
106—light transmission elements.
108—First water blocking element.
110—Cylindrical enclosure.
112—The second water blocking element.
114—Protective cover.
116—The first robust component of the first pair of robust component.
118—The second robust component of the first pair of robust component.
116-118—The first pair of robust component.

120—The first robust component of the second pair of robust component.
122—The second robust component of the second pair of robust component.
120-122—The second pair of robust component.
116-122—Plurality of robust components (the first robust component of the first pair of robust component 116, the second robust component of the first pair of robust component 118, the first robust component of the second pair of robust component 120 and the second robust component of the second pair of robust component 122.
124—The first tearing string.
126—The second tearing string.
124-126—Plurality of tearing strings.
200—The optical waveguide cable.
202—Optical elements.
204—Average height.
206—Average width.
208—Water blocking element.
210—Cylindrical enclosure.
212—The first diameter.
300—The optical waveguide cable.
302—Cylindrical enclosure.
304—Optical element.
306—Water blocking element.
308—The first diameter.
310—Diagonal length.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a cross-sectional view of an optical waveguide cable 100 for outdoor applications, in accordance with an embodiment of the present disclosure. The cross sectional view describes a layered structure and distribution of discrete elements of the optical waveguide cable 100. The layered structure of the optical waveguide cable 100 includes one or more optical waveguide bands 104, a first water blocking element 108, a cylindrical enclosure 110, a second water blocking element 112, a protective cover 114. In addition, the optical waveguide cable 100 includes a plurality of robust components 116-122, a plurality of tearing strings 124-126 and one or more layers.

The optical waveguide cable 100 is defined by a longitudinal axis 102 passing through a geometrical center of the optical waveguide cable 100. The optical waveguide cable 100 is used for communication purposes. In addition, the optical waveguide cable 100 is used for aerial installations, underground installations and the like. Also, the optical waveguide cable 100 is used for broadband applications, communication applications and the like.

The optical waveguide cable 100 includes the one or more optical waveguide bands 104. The one or more optical waveguide bands 104 are positioned substantially along the longitudinal axis 102 of the optical waveguide cable 100. In general, a plurality of light transmission elements 106 are sandwiched, encapsulated, and/or edge bonded to form an optical waveguide band. In general, each of the plurality of light transmission elements 106 in the one or more optical waveguide bands 104 is a light transmission element used for transmitting information as light pulses. The information is transmitted as light pulse from the one end of the optical waveguide cable 100 to another end of the optical waveguide cable 100. In addition, each of the plurality of light transmission elements 106 is a thin strand of glass capable of transmitting optical signals. Also, each of the plurality of light transmission elements 106 is configured to transmit large amounts of information over long distances with relatively low attenuation. Further, each of the plurality of light transmission elements 106 includes a core region and a cladding region. The core region is an inner part of the light transmission element and the cladding section is an outer part of the light transmission element. Moreover, the core region is defined by the longitudinal axis 102 of each of the plurality of light transmission elements 106. In addition, the cladding region surrounds the core region. In an embodiment of the present disclosure, the plurality of light transmission elements 106 is made of silicon glass. In another embodiment of the present disclosure, the plurality of light transmission elements 106 is made of another material.

In an embodiment of the present disclosure, the number of light transmission elements 106 in the one or more optical waveguide bands 104 is fixed. In another embodiment of the present disclosure, the number of light transmission elements in the one or more optical waveguide 104 bands may vary. Further, a plurality of optical waveguide bands is aggregated to form an optical element. In an example the optical element includes stack of at least two optical waveguide bands. The optical element has various sizes and shapes. In an embodiment of the present disclosure, the one or more optical waveguide bands 104 are arranged to form a rectangular shape optical element. In another embodiment of the present disclosure, the one or more optical waveguide bands 104 may be arranged to form any different shape. In an embodiment of the present disclosure, the fill factor of the one or more optical waveguide bands 104 is about 0.445. In addition, the fill factor of the one or more optical waveguide bands 104 is a ratio of average cross-sectional area of the one or more optical waveguide bands 104 to average cross-sectional area of the cylindrical enclosure 110.

In an embodiment of the present disclosure, the attenuation change of the plurality of light transmission elements 106 is less than 0.05 dB/km in a temperature range from −40 degree Celsius to +70 degree Celsius in a time period of 2 cycles. Each cycle of the 2 cycles includes a time period of 12 hours. In another embodiment of the present disclosure, each of the plurality of light transmission elements 106 has maximum attenuation of about 0.36 dB/Km at a wavelength of about 1310 nanometers at a room temperature. In general, the room temperature is having a range of about 20 degree Celsius to 25 degree Celsius. In yet another embodiment of the present disclosure, each of the plurality of light transmission elements 106 has maximum attenuation of about 0.24 dB/Km at a wavelength of about 1550 nanometers at the room temperature. In yet another embodiment of the present disclosure, each of the plurality of light transmission 106 elements has maximum attenuation of about 0.26 dB/Km at a wavelength of about 1625 nanometers at the room temperature. The attenuation of each of the plurality of light transmission elements 106 correspond to a loss in optical power as the light travels through the plurality of light transmission elements. In an embodiment of the present disclosure, the plurality of light transmission elements in the one or more optical waveguide bands 104 is a single mode light optical transmission element. In another embodiment of the present disclosure, the plurality of light transmission elements 106 in the one or more optical waveguide bands 104 is a multi-mode optical transmission element. In an embodiment of the present disclosure, each of the plurality of light transmission elements has a fill factor of about 0.109. In addition, the fill factor of the plurality of light transmission elements 106 is a ratio of average cross-sectional area of the plurality of light transmission elements 106 to average cross-sectional area of the cylindrical enclosure 110.

The optical waveguide cable 100 includes one or more layers. In an embodiment of the present disclosure, the one or more layers include the first water blocking element 108. The first water blocking element 108 surrounds the one or more optical waveguide bands. In general, the water blocking element prevents ingression of water in and around the one or more optical waveguide bands 104. In an example, the first water blocking element 108 is a water swellable tape. In another example, the first water blocking element 108 may include any other water repellent material. Moreover, the first water blocking element 108 has water repellant properties which does not allows the ingression of water in and around the one or more optical waveguide bands 104.

The optical waveguide cable 100 includes one or more layers. In an embodiment of the present disclosure, the one or more layers include the cylindrical enclosure 110 positioned substantially along the longitudinal axis 102 of the optical waveguide cable 100. The cylindrical enclosure 110 surrounds the first water blocking element 108. The cylindrical enclosure 110 in the optical waveguide cable 100 provides a sound covering to the one or more optical waveguide bands 104. In addition, the cylindrical enclosure 110 provides mechanical isolation, physical damage protection and identification of one or more optical waveguide bands 104.

In an embodiment of the present disclosure, the cylindrical enclosure 110 is made of a medium density polyethylene material. The medium density polyethylene material has a density of about 0.935 gram per cubic centimeter of the cylindrical enclosure 110. In addition, the medium density polyethylene material provides an environmental stress cracking resistance of at least 500 hour to the cylindrical enclosure 110. In an embodiment of the present disclosure, the environmental stress cracking resistance corresponds to the ability of the medium density polyethylene material to resist the environmental stress cracking in the optical waveguide cable. Further, the medium density polyethylene material used for the cylindrical enclosure 110 has a melt mass flow rate of about 0.70 gram per 10 minute.

In an embodiment of the present disclosure, the melt mass flow rate is an indication of the viscosity of the medium density polyethylene material in the melt phase. In addition, the melt mass flow rate is the rate of flow of mass of the medium density polyethylene material per 10 minutes through a capillary when a pressure is applied on capillary at a specific temperature. Further, the melt mass flow rate is a measure of the ability of the material's melt to flow under pressure. In addition, the medium density polyethylene material provides a tensile strength of about 4000 mega Pascal to the cylindrical enclosure 110. The tensile strength corresponds to a resistance shown by the optical waveguide cable 100 against regaining elastic nature when tension is applied. Further, the cylindrical enclosure 110 has a brittleness temperature of at most 100 degree Celsius. The cylindrical enclosure 110 has a kink radius of about 4D millimeter, where D is diameter of cylindrical enclosure 110. The kink radius corresponds to the minimum radius of the cylindrical enclosure 110 to bend without kinking or damaging the cylindrical enclosure 110. The cylindrical enclosure 110 is characterized by a tensile elongation of about 1000 percent. The tensile elongation is defined as the strain at break. In addition, tensile elongation is defined as the percent change in length at break.

In another embodiment of the present disclosure, the cylindrical enclosure 110 is made from a material selected from the group. The group includes thermoplastic material, polyethylene material and low smoke zero halogen. In another embodiment of the present disclosure, the cylindrical enclosure 110 is made from any suitable metallic material. In yet another embodiment of the present disclosure, the cylindrical enclosure 110 is made of any other suitable material.

In an embodiment of the present disclosure, the one or more layers include a single cylindrical enclosure 110. In addition, the cylindrical enclosure 110 is made of at least one layer. Further, each layer of the at least one layer is made of homogeneous material. In general, the homogeneous material represents the material having a uniform composition throughout the area. In an example, the homogeneous material include but may not be limited to High Density Polyethylene, polypropylene, medium density polyethylene, polyvinyl chloride, Low density polyethylene and polyethylene or ethylene vinyl acetate (EVA) base Low smoke zero halogen. In another embodiment of the present disclosure, each layer of the at least one layer is made of a combination of a plurality of materials. In an example, the material include but may not be limited to High Density Polyethylene, polypropylene, medium density polyethylene, polyvinyl chloride, Low density polyethylene and polyethylene base low smoke zero halogen and ethylene vinyl acetate (EVA) base Low smoke zero halogen. In an embodiment of the present disclosure, the cylindrical enclosure 110 is constructed from an extruded polymeric material. In addition, the polymeric material is selected from the group. The group includes High Density Polyethylene, polyethylene terephthalate, polypropylene, polyethylene; polyvinyl chloride, Low density polyethylene, polyethylene base low smoke zero halogen and ethylene vinyl acetate (EVA) base low smoke zero halogen. In another embodiment of the present disclosure, the cylindrical enclosure 110 is constructed from a pultruded fiber reinforced plastic material. In an embodiment of the present disclosure, the cylindrical enclosure 110 may include a material to provide high temperature and chemical resistance. In an example, the cylindrical enclosure 110 may include an aromatic material or polysulfone material. In another example, the cylindrical enclosure 110 may include any other suitable material.

The cylindrical enclosure 110 is characterized by a first diameter and a second diameter. In an embodiment of the present disclosure, the first diameter and the second diameter of the cylindrical enclosure 110 is fixed when the number of light transmission elements is fixed. In an example, the first diameter of the cylindrical enclosure 110 is about 8.0 millimeter and the second diameter of the cylindrical enclosure 110 is about 6.4 millimeter. In another embodiment of the present disclosure, the first diameter and the second diameter of the cylindrical enclosure 110 may vary according to the change in number of the light transmission elements inside the optical waveguide cable 100.

In an embodiment of the present disclosure, the density of the cylindrical enclosure 110 is less than 0.935 gram per cubic centimeter. The density of the cylindrical enclosure 110 is calculated based on the plurality of conditions. The plurality of conditions includes a temperature range of about 21 degree Celsius to 25 degree Celsius. In addition, the plurality of conditions includes a relative humidity of about 40% to 60%. Further, the plurality of conditions is required for at least 40 hours before the test to find out the density of the cylindrical enclosure 110. In addition, the cylindrical enclosure 110 has the density of at most 40% of the density of bare silicon glass light transmission element at a temperature of about 25±3 degree Celsius. Further, the cylindrical enclosure 110 has the density of at most 40% of the density of the plurality of light transmission elements 106.

In an embodiment of the present disclosure, the cylindrical enclosure 110 is dry. The dry cylindrical enclosure 110 represents the cylindrical enclosure without any gel. The dry cylindrical enclosure 110 facilitates easy splicing of the optical waveguide cable 100. The splicing does not require any cleaning agents to dissolve greasy filling compounds inside the optical waveguide cable 100. Thus, reduces the overall installation/midspan time.

In another embodiment of the present disclosure, the cylindrical enclosure 110 includes a filling gel. The filling gel prevents ingression of water inside the cylindrical enclosure 110. In an example, the cylindrical enclosure 110 requires less amount of gel which reduces messiness and clean up time during the installation process of the optical waveguide cable 100. In an example, the filling gel is a thixotropic gel.

In an embodiment of the present disclosure, the optical waveguide cable 100 has a waveguide area factor of about 44%. The waveguide area factor is defined as a ratio of the average cross sectional area of the one or more optical waveguide bands 104 with the average cross sectional area of the cylindrical enclosure 110. The average cross sectional area of the one or more optical waveguide bands 104 and the average cross sectional area of the cylindrical enclosure 110 define a ratio of about 0.40. In addition, the average cross sectional area of one or more optical waveguide bands 104 represents about 40% of the average cross sectional area of the cylindrical enclosure 110.

The one or more optical waveguide bands 104 are coupled longitudinally with the one or more layers. The coupling of the one or more optical waveguide bands 104 with the one or more layers is defined by at least one corner of the one or more optical waveguide bands 104 and the one or more layers. In addition, the at least one corner of the one or more optical waveguide bands 104 is coupled with the one or more layers along the longitudinal axis 102. In an example, the first water blocking element 108 provides coupling of the cylindrical enclosure 110 with the one or more optical waveguide bands 104. The first water blocking element 108 positioned in between the cylindrical enclosure 110 and the one or more optical waveguide bands 104. The coupling restricts the movement of the one or more optical waveguide bands 104 inside the one or more layers as a result of processing, installation and handling. In addition, the coupling prevents the undesirable effects of signal loss. Further, the one or more optical waveguide bands 104 are coupled longitudinally with the one or more layers to prevent displacement of the optical waveguide band, when a force is applied to install the cable.

In an embodiment of the present disclosure, the optical waveguide cable 100 includes a second water blocking element 112. The second water blocking element 112 is used to prevent ingression of water and moisture in and around the cylindrical enclosure 110 of the optical waveguide cable 100. In addition, the second water blocking element 112 is used for inhibiting the migration of water along the optical waveguide cable 100. In an example, the second water blocking element 112 includes water swellable tape. In another example the second water blocking element 112 is any other water repellent material. Moreover, the second water blocking element 112 has water repellant properties which does not allows the ingression of water in and around the cylindrical enclosure 110.

The optical waveguide cable 100 includes a protective cover 114. In an example, the protective cover 114 may be a sheath or a jacket. In an embodiment of the present disclosure, the protective cover 114 is made of a medium density polyethylene material. The medium density polyethylene material of the protective cover 114 has a density of about 0.935 gram per cubic centimeter. In addition, the medium density polyethylene material provides an environmental stress cracking resistance of at least 500 hour to the protective cover 114. In an embodiment of the present disclosure, the environmental stress cracking resistance corresponds to the ability of the medium density polyethylene material to resist the environmental stress cracking in the optical waveguide cable. Further, the medium density polyethylene material of the used for the protective cover 114 has a melt mass flow rate of about 0.70 gram per 10 minute. In an embodiment of the present disclosure, the melt mass flow rate is an indication of the viscosity of the medium density polyethylene material in the melt phase. In addition, the melt mass flow rate is the rate of flow of mass of the medium density polyethylene material per 10 minutes through a capillary when a pressure is applied on capillary at a specific temperature. Further, the melt mass flow rate is a measure of the ability of the material's melt to flow under pressure. In addition, the medium density polyethylene material provides a tensile strength of about 4000 mega Pascal to the protective cover 114. The tensile strength corresponds to a resistance shown by the optical waveguide cable 100 against regaining elastic nature when tension is applied. Further, the protective cover 114 has a brittleness temperature of at most 100 degree Celsius. The protective cover 114 is characterized by a tensile elongation at break of about 1000 percent. The tensile elongation is defined as the strain at break. In addition, tensile elongation is defined as the percent change in length at break.

In another embodiment of the present disclosure, the protective cover 114 is made of a material selected from the group. The group includes Low smoke zero halogen, polyethylene, polyamides, polypropylene, UV proof black polyethylene, UV proof high density polyethylene and UV proof low density polyethylene. In another embodiment of the present disclosure, the protective cover 114 is made of any other suitable material.

The protective cover 114 improves the mechanical performance of the optical waveguide cable 100. In addition, the protective cover 114 protects the optical waveguide cable 100 against crush, bend and tensile stress along the length of the optical waveguide cable 100. urther, the protective cover 114 provides ultraviolet protection to the optical waveguide cable 100 for outdoor purposes.

In an embodiment of the present disclosure, the one or more layers may include specific layers to attain specific properties for the optical waveguide cable 100. In an example, the one or more layers include a layer of fire resistance tape to protect the optical waveguide cable 100 against fire. In another example, the one or more layers include an armor layer of corrugated ECCS tape to limit the signal attenuation during fire. In yet another example, the one or more layers include a layer of glass roving yarns to protect various elements inside the cylindrical enclosure 110 of the optical waveguide cable 100 against the crush resistance and kinks. In yet another example, the one or more layers include a layer of binder yarns for binding of cables under the protective cover 114. In yet another example, the one or more layers include a layer of aramid yarns to meet the tensile strength of the optical waveguide cable 100. In yet another embodiment of the present disclosure, the one or more layers is selected from a group. The group includes but may not be limited to fire resistance tape layer, water swellable tape layer, armor layer, glass roving yarn layer, binder yarn layer and aramid yarn layer.

In an embodiment of the present disclosure, the optical waveguide cable 100 includes a plurality of robust components 116-122. In an embodiment of the present disclosure, each of the plurality of robust components 116-122 is embedded inside the protective cover 114. The plurality of robust components 116-122 provides strength and minimizes shrinkage during temperatures variations. In an example, the plurality of robust components 116-122 includes a first pair of robust components 116-118 and a second pair of robust component 120-122. The first pair of robust component 116-118 is diagonally opposite to second pair of robust component 116-118. The first pair of robust component 116-118 includes the first robust component of the first pair of robust component 116 and the second robust component of the first pair of robust component 118. The second pair of robust component 120-122 includes the first robust component of the second pair of robust component 120 and the second robust component of the second pair of robust component 122. In addition, the size of first pair of robust component 116-118 and second pair of robust component 120-122 is equal. The plurality of robust components 116-122 acts as anti-buckle or anti-shrink elements for the optical waveguide cable 100. In an embodiment of the present disclosure, each of the plurality of robust components 116-122 is circular in cross section. In general, the plurality of robust components 116-122 is used to achieve the environmental and tensile requirements. In addition, the plurality of robust components 116-122 is used to restrict shrinkage of the optical waveguide cable 100 during thermal cycling. Moreover, the plurality of robust components 116-122 provides robustness and tensile strength to the optical waveguide cable 100. In an embodiment of the present disclosure, the plurality of robust components 116-122 is made of a material selected from the group. The group includes Fiber reinforced plastic and steel wires. In another embodiment of the present disclosure, the plurality of robust components 116-122 is made of any other suitable metal or non-metal material. In yet another embodiment of the present disclosure, the plurality of robust components 116-122 is made of any other suitable material.

The optical waveguide cable 100 includes a plurality of tearing strings 124-126. The plurality of tearing strings 124-126 is present below the protective cover 114. Further, the plurality of tearing strings 124-126 includes first tearing string 124 and the second tearing string 126. In an embodiment of the present disclosure, the first tearing string 124 is diagonally opposite to the second tearing string 126. In addition, the plurality of tearing strings 124-126 lies substantially along the longitudinal axis 102 of the optical waveguide cable 100. In an embodiment of the present disclosure, the plurality of tearing strings 124-126 facilitates stripping of the one or more layers. In an embodiment of the present disclosure, the plurality of tearing strings 124-126 is made of a polyester material. In another embodiment of the present disclosure, the plurality of tearing strings 124-126 is made of any other suitable materials. In addition, each of the plurality of tearing strings 124-126 has a circular cross-section.

In an embodiment of the present disclosure, the optical waveguide cable 100 has a weight of about 150 kg/kilometer. In an embodiment of the present disclosure, the optical waveguide cable 100 has a diameter of about 15 kilometers. In another embodiment of the present disclosure, the optical waveguide cable 100 may have any suitable value of weight and diameter.

In an embodiment of the present disclosure, the optical waveguide cable 100 has a short term tensile strength of about 2700 Newton and long term tensile strength of about 900 Newton. In an embodiment of the present disclosure, the minimum bending radius of the optical waveguide cable 100 during installation is 20 D and during operation is 15 D. In an embodiment of the present disclosure, the crush resistance of the optical waveguide cable 100 is about 4000 Newton per 100 millimeter. In an embodiment of the present disclosure, the impact strength of the optical waveguide cable 100 is 25 Newton meter. In an embodiment of the present disclosure, the torsion of the optical waveguide cable 100 is ±180 degree. In another embodiment of the present disclosure, the optical waveguide cable 100 has any suitable value or range of crush resistance, impact strength, torsion, tensile strength, minimum bending radius and temperature performance.

FIG. 2 illustrate a cross sectional view of an optical waveguide cable 200 with an optical waveguide factor in accordance with another embodiment of the present disclosure. In an embodiment of the present disclosure, the optical waveguide cable 200 includes one or more optical elements 202. The one or more optical elements 202 include one or more optical waveguide bands. In addition, the one or more optical elements 202 are the stack of the one or more optical waveguide bands. In an example, the one or more optical elements include at least two optical waveguide bands. Each optical waveguide band includes a plurality of light transmission elements 106. The one or more optical elements 202 have an average cross sectional area defined by average height 204 and average width 206. In addition, the optical waveguide cable 200 includes a water blocking element 208. In an embodiment of the present disclosure, the water blocking element 208 is a water blocking tape. The water blocking element 208 surrounds the one or more optical elements 202. Further, the optical waveguide cable 200 includes a cylindrical enclosure 210. The cylindrical enclosure 210 surrounds the water blocking element 208. The water blocking element 208 is used to prevent ingression of water in and around the one or more optical elements 202. The cylindrical enclosure 210 has an average cross sectional first area defined by a first diameter 212 of the cylindrical enclosure 210. The first area is the inner area and the first diameter is the inner diameter of the cylindrical enclosure 210. In general, the cylindrical enclosure 210 has a circular profile. The average cross sectional first area of the cylindrical enclosure 210 is calculated by using the formula for area of a circle. The formula used to find the area of circle is pi*radius*radius. The radius of the cylindrical enclosure 210 is half of the first diameter 212. The value of pi is defined as 3.14. The average cross sectional first area of the cylindrical enclosure 210 and the average cross sectional area of the one or more optical elements 202 define a ratio of about 0.40. In addition, the average cross sectional area of the one or more optical elements 202 represents about 40% of the average cross sectional first area of the cylindrical enclosure 210.

FIG. 3 illustrates a cross sectional view of an optical waveguide cable 300 with a cylindrical enclosure 302 in accordance with yet another embodiment of the present disclosure. The cylindrical enclosure 302 includes an optical element 304. Further, the optical element 304 includes one or more optical waveguide bands. In general, the optical element 304 is a stack of the one or more optical waveguide bands. Moreover, each optical waveguide band includes a plurality of light transmission elements. Further, the optical waveguide cable 300 includes a water blocking element 306 in between the optical element 304 and the cylindrical enclosure 302. The water blocking element 306 is used to prevent ingression of water in and around the optical element 304.

In an example, the optical element 304 includes 10 optical waveguide bands. Further, each optical waveguide band includes 10 light transmission elements. The total number of light transmission element present in the optical element 304 is 100(10*10=100). In another example, the optical element 304 may include any number of optical waveguide bands and each optical waveguide band may include any number of light transmission element. In an embodiment of the present disclosure, the cylindrical enclosure 302 has a specified first diameter. The first diameter is the inner diameter of the cylindrical enclosure 302. In addition, the optical element 304 has a specified diagonal length. The first diameter of the cylindrical enclosure 302 is more than the diagonal length of the optical element 304. In an embodiment of the present disclosure, the cylindrical enclosure 302 is at a diagonal distance of about 0.9 millimeter from the diagonal end of the optical element 304.

In an example, the first diameter 308 of the cylindrical enclosure 302 is D and the diagonal length 310 of the optical element 304 is d. The diagonal distance of the optical waveguide cable 300 is defined by a distance of 0.9 millimeter (D−d=0.9). The diagonal distance defines the quality of the optical waveguide cable 300. In another example, the diagonal distance may vary in the optical waveguide cable 300 according to the increase or decrease in number of light transmission element.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. An optical waveguide cable defined by a longitudinal axis passing through a geometrical center of the optical waveguide cable, the optical waveguide cable comprising:
   one or more optical waveguide bands positioned substantially along the longitudinal axis of the optical waveguide cable, wherein each of the one or more optical waveguide bands has a plurality of light transmission elements, wherein the plurality of light transmission element has the same MAC number;
   one or more layers substantially concentric to the longitudinal axis of the optical waveguide cable, wherein the one or more layers surround the one or more optical waveguide bands and wherein each of the one or more layers being substantially along the longitudinal axis of the optical waveguide cable, wherein each of the one or more layers is a single layer tape and wherein the one or more layers are non-overlapping with respect to each other, the one or more layers comprising:
      a cylindrical enclosure positioned substantially along the longitudinal axis of the optical waveguide cable, wherein the one or more optical waveguide bands are coupled longitudinally with the one or more layers, wherein an inner diameter of the cylindrical enclosure is greater than a diagonal length of each of the one or more optical waveguide bands, and wherein a difference between the inner diameter and the diagonal length is constant throughout the length of the cable.

2. The optical waveguide cable as recited in claim 1, wherein the at least one corner of the one or more optical waveguide bands is coupled longitudinally with the one or more layers, restricting the movement of the one or more optical waveguide bands inside the one or more layers.

3. The optical waveguide cable as recited in claim 1, wherein wherein the coupling of the one or more layers with the at least one corner of the one or more optical waveguide bands is due to a high waveguide factor.

4. The optical waveguide cable as recited in claim 1 wherein the difference between the inner diameter of the cylindrical enclosure and the diagonal length of each of the each of the one or more optical waveguide bands is 0.9.

5. The optical waveguide cable as recited in claim 1, wherein the cylindrical enclosure is made of a medium density polyethylene material, wherein the medium density polyethylene material has at least one of:
   an environmental stress cracking resistance of at least 500 hour;
   a tensile strength of 4000 mega Pascal;
   a brittleness temperature of 100 degree Celsius; and
   a tensile elongation at break of 1000 percent.

6. The optical waveguide cable as recited in claim 1, wherein the one or more optical waveguide bands is defined by a waveguide factor of 44%.

7. The optical waveguide cable as recited in claim 1 wherein the one or more layers further comprises at least one of:
   a first water blocking element inside the cylindrical enclosure which surrounds the one or more optical waveguide bands;

a fire resistance tape, a water swellable tape layer, an ECCS armor layer, a glass roving yarn layer, a binder yarn layer and an aramid yarn layer, wherein all the layers are non-overlapping; and a second water blocking tape and a protective cover.

8. The optical waveguide cable as recited in claim 1, wherein the protective cover is made of a medium density polyethylene material having at least one of:
- a density of 0.935 gram per cubic centimetre;
- a melt mass flow rate of 0.70 gram per 10 minute;
- an environmental stress cracking resistance of at least 500 hour;
- a tensile strength of 4000 mega Pascal;
- a brittleness temperature of at most 100 degree Celsius; and
- a tensile elongation at break of 1000 percent.

9. The optical waveguide cable as recited in claim 1 further comprising a plurality of robust components, wherein the plurality of robust components are embedded inside the protective cover of the optical waveguide cable.

10. The optical waveguide cable as recited in claim 1, wherein the plurality of robust components further comprising a first pair of robust components and a second pair of robust component positioned diagonally opposite to each other.

11. The optical waveguide cable as recited in claim 1, wherein the cylindrical enclosure is at a diagonal distance of 0.9 millimeter from the one or more optical waveguide bands.

12. The optical waveguide cable as recited in claim 1, wherein the one or more optical waveguide bands with a fill factor of 0.445.

13. The optical waveguide cable as recited in claim 1, wherein the plurality of light transmission elements has a fill factor of 0.109.

14. The optical waveguide cable as recited in claim 1, wherein the plurality of light transmission elements is made of silicon glass.

15. The optical waveguide cable as recited in claim 1, wherein the plurality of light transmission elements has at least one of:
- an attenuation change of at most 0.05 dB/km at a wavelength of 1550 nanometer at a temperature range of −40 degree Celsius to +70 degree Celsius in a time period of 2 cycles with 12 hours per cycle;
- a maximum attenuation of 0.36 dB/km at a wavelength of 1310 nanometers at a temperature range of 20 degree Celsius to 25 degree Celsius;
- a maximum attenuation of 0.24 dB/km at a wavelength of 1550 nanometers at a temperature range of 20 degree Celsius to 25 degree Celsius; and
- a maximum attenuation of 0.26 dB/km at a wavelength of 1625 nanometers at a temperature range of 20 degree Celsius to 25 degree Celsius.

* * * * *